No. 827,740. PATENTED AUG. 7, 1906.
A. A. LOW.
EYEGLASSES.
APPLICATION FILED MAR. 6, 1905.
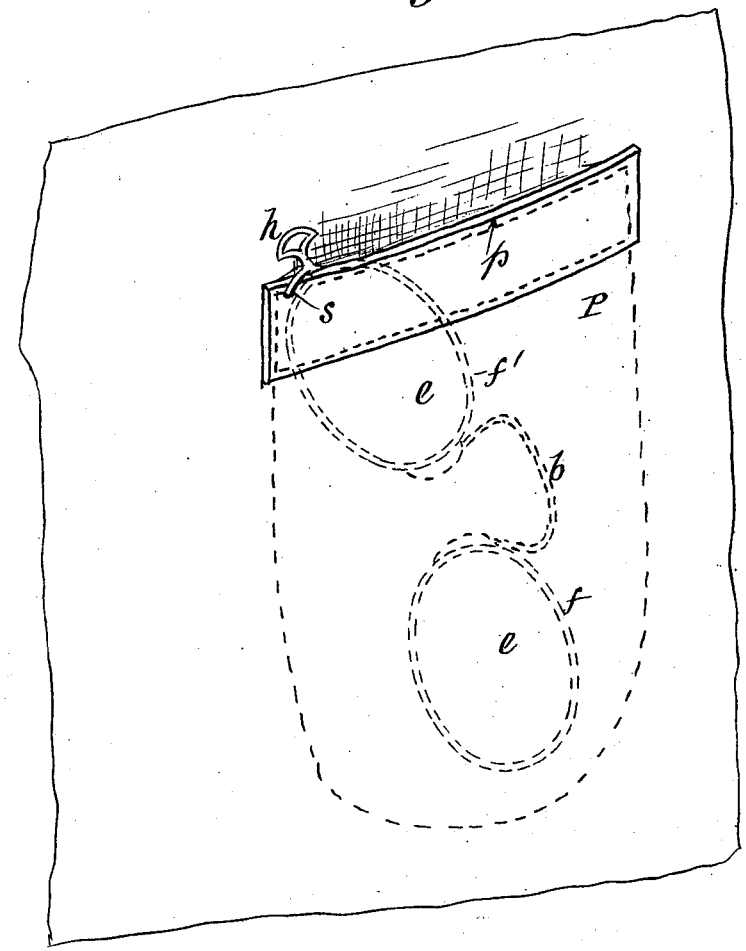
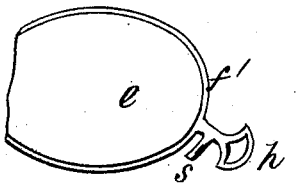
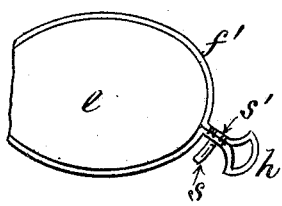
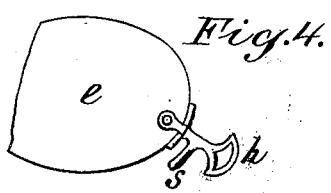
Witnesses:
D. W. Gardner.
George P. Brand.
Inventor:
Abbot Augustus Low
By his Attorney
Geo. Wm. Miatt
THE NORRIS PETERS CO., WASHINGTON, D. C.

UNITED STATES PATENT OFFICE.

ABBOT AUGUSTUS LOW, OF HORSESHOE, NEW YORK.

EYEGLASSES.

No. 827,740.　　　Specification of Letters Patent.　　　Patented Aug. 7, 1906.

Application filed March 6, 1905. Serial No. 248,517.

*To all whom it may concern:*

Be it known that I, ABBOT AUGUSTUS LOW, a citizen of the United States, residing at Horseshoe, St. Lawrence county, State of New York, have invented certain new and useful Improvements in Eyeglasses, of which the following is a specification.

My invention relates to eyeglasses and the like to be used and carried upon the person, and is designed to obviate the delay and inconvenience incident to their recovery for instant use after having been placed temporarily in a vest or other pocket, as is the usual habit where nose-glasses are employed. In other words, the practice of placing or storing the eyeglasses in a vest or other pocket when the same are not required for actual use is inconvenient, in that the glasses fall to the bottom of the pocket and assume various positions therein, which render their recovery uncertain, slow, and difficult under ordinary conditions of use.

I obviate these objections by my invention, which consists, essentially, in forming the eyeglasses with a finger by which they may be suspended upon the open edge of the pocket in such manner as to be readily and conveniently accessible and removable for immediate use, substantially as hereinafter described and claimed specifically.

In the accompanying drawings, Figure 1 is a view illustrating the practical application of my invention. Fig. 2 is a detail view showing my suspending hook or finger; Fig. 3, a similar view showing a modified structure; Fig. 4, a similar view showing a modified structure applied to a rimless eyeglass.

In the drawings, $e\ e$ represent a pair of ordinary eyeglasses, mounted in frames $f\ f'$, united by a nose-bridge $b$, of any desired or well-known construction. The right-hand frame $f'$ by preference, which is usually provided with the handle or finger-piece $h$, is formed with the suspending-finger $s$, projecting from the handle $h$.

Where frameless glasses are used, the handle $h$ and suspending-finger $s$ may be secured directly to the right-hand glass in the manner usually resorted to in attaching the handle $h$ to a rimless eyeglass.

In the structure shown in Fig. 3 the suspending-finger $s$ consists of an extension of the screw $s'$, by which the ends of the frame $f'$ are secured together.

The suspending-finger projects in substantially the same plane as that of the handle and glass, the object being to afford a means of suspension upon the edge $p$ of the pocket P, so as to support and sustain the eyeglasses in convenient position for removal when desired for use.

It is to be noted that the end of my suspending finger is not sharp or pointed, but is purposely made blunt, so that there is no danger of scratching or otherwise injuring the person, the object being not to penetrate the garment of the wearer, but to simply suspend the eyeglasses temporarily on the edge of a vest-pocket or the edge of a pocket of any other garment.

I am aware of Letters Patent No. 189,511, issued to J. S. Spencer April 10, 1877, which shows pointed hooks projecting at right angles to the plane of the glass and frame for the purpose of penetrating the garment of the wearer; but this is a construction I seek to avoid, and it does not anticipate my blunt suspending-finger (not at right angles thereto) for the purpose of affording means of support by straddling the edge of a pocket, as herein set forth.

It is deemed important that the finger $s$ be rigid with the handle and that it extend in a plane parallel with and concentric to the frame and at right angles to the length of the handle, so that when the eyeglasses are in the pocket, as seen in Fig. 1, the upper edge $p$ of the pocket is engaged between the rim of the frame and said finger and the glasses securely held.

What I claim as my invention, and desire to secure by Letters Patent, is—

1. An eyeglass provided with a handle having a rigid blunt suspending-finger, projecting at substantially right angles from said handle between the same and the eyeglass and curved substantially concentric with the rim to engage over the edge of a pocket, the said edge of the pocket being received between said finger and the rim of the eyeglass.

2. An eyeglass provided with a frame the ends of which are secured together by a screw which extends beyond the frame and in the same plane therewith to form a suspending-finger for the purpose described.

ABBOT AUGUSTUS LOW.

Witnesses:
　D. W. GARDNER,
　GEO. WM. MIATT.